(12) United States Patent
Sivula

(10) Patent No.: US 6,907,239 B1
(45) Date of Patent: Jun. 14, 2005

(54) CHARGING FOR TELECOMMUNICATIONS DOWNLOAD SERVICES

(75) Inventor: Timo E Sivula, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 586 days.

(21) Appl. No.: 09/716,680

(22) Filed: Nov. 20, 2000

(30) Foreign Application Priority Data

Nov. 22, 1999 (FI) ................................................. 992485

(51) Int. Cl.$^7$ ........................................... H04M 11/00
(52) U.S. Cl. ...................... 455/406; 455/407; 455/408; 455/409; 379/114.16; 379/114.17; 379/114.2
(58) Field of Search ................................. 455/406, 407, 455/408, 410, 414, 422; 379/111, 114.01, 114.03, 114.15, 114.16, 114.19, 114.2, 114.21, 114.23, 114.28, 127.04

(56) References Cited

U.S. PATENT DOCUMENTS

| | | | | |
|---|---|---|---|---|
| 4,706,275 A | | 11/1987 | Kamil | 379/144 |
| 5,301,234 A | * | 4/1994 | Mazziotto et al. | 380/247 |
| 5,412,726 A | | 5/1995 | Nevoux et al. | 380/24 |
| 5,577,109 A | * | 11/1996 | Stimson et al. | 379/114.2 |
| 5,583,918 A | * | 12/1996 | Nakagawa | 455/409 |
| 5,610,973 A | * | 3/1997 | Comer | 455/413 |
| 5,671,279 A | * | 9/1997 | Elgamal | 705/79 |
| 5,909,485 A | | 6/1999 | Martin et al. | 379/144 |
| 6,035,025 A | * | 3/2000 | Hanson | 379/114.2 |
| 6,188,752 B1 | * | 2/2001 | Lesley | 379/114.16 |
| 6,222,915 B1 | * | 4/2001 | Mueller et al. | 379/114.15 |
| 6,270,406 B1 | * | 8/2001 | Sultan | 463/17 |
| 6,377,810 B1 | * | 4/2002 | Geiger et al. | 455/456.2 |
| 6,393,269 B1 | * | 5/2002 | Hartmaier et al. | 455/406 |
| 6,434,378 B1 | * | 8/2002 | Fougnies | 455/406 |
| 6,490,367 B1 | * | 12/2002 | Carlsson et al. | 382/137 |
| 6,587,837 B1 | * | 7/2003 | Spagna et al. | 705/26 |

FOREIGN PATENT DOCUMENTS

| | | | | |
|---|---|---|---|---|
| FR | 2696067 | | 3/1994 | |
| FR | 2745970 | | 9/1997 | |
| WO | WO96/41462 | * | 12/1996 | H04M/11/00 |
| WO | WO 98/47112 | | 10/1998 | |
| WO | WO98/47112 | * | 10/1998 | G07F/17/16 |

* cited by examiner

*Primary Examiner*—Stephen D'Agosta
(74) *Attorney, Agent, or Firm*—Perman & Green, LLP

(57) ABSTRACT

A method, system and computer program product for prepayment of a service includes informing the user of the availability of a plurality of different services. An indication and request of a desired service is received from the user over a first communications link. The requested service is provided to the user over a second communications link. To indicate prepayment for the service requested an authentication key is received from the user. The validity of the authentication key received is verified and the service is provided if the authentication key is valid.

12 Claims, 5 Drawing Sheets

CHARGING FOR TELECOMMUNICATIONS DOWNLOAD SERVICES

FIELD OF THE INVENTION

This invention relates to charging for telecommunication services.

BACKGROUND OF THE INVENTION

The most recently developed mobile telephones have a number of different functions that can be updated by information downloaded from a telecommunications network operator. They are downloaded from the network or provided by an operator or some other service provider. For example, ringing tones can be downloaded to a mobile phone from the mobile network. For example, Finnish telecommunications operator Sonera has a service in which a request for a new ringing tone is sent from a mobile phone by a Short Message (SM) supported by the Short Message Service (SMS). SMS is known from the Global System for Mobile communications (GSM) system. In response to a short message received from a user, the requested ringing tone is provided to the mobile phone by a SM. A charge is made for this service in a subsequent invoice for use of the mobile phone.

Whilst a telecommunications network provides a convenient way for a service provider to provide a service to a user and charge the user for the service, a problem arises when the service provider is not the telecommunications network operator itself. In that case the service provider must have a debiting agreement with the telecommunications network operator for the charge to be included in a telephone invoice of the user. Therefore the service provider needs to have a contract with each telecommunications network operator which relays any of its services. For a service provider providing services globally the present number of telecommunications network operators is far too large for this to be reasonable. Clearly, since there is a time period between provision of the service and payment to the service provider, in effect the service provider is giving a short-term loan to the user of the service. This involves a credit risk. It would be convenient if the payment could be received before the service is provided so that the service provider receives payment beforehand.

As an example of prepaying for a service, Sonera has a prepaid subscription arrangement called "Easy" for establishing and maintaining a mobile telephone subscription with prepaying of phone calls and sending of short messages. Using the service allows ordinary mobile telephone operations such as making mobile telephone calls and sending and receiving short messages. In this arrangement, a user initially buys a Subscriber Identification Module (SIM) card with a predetermined monetary value that can be used for making telephone calls and for sending SMs. The initial price of the SIM card is about 65 USD. Next, the user needs to call to an automatic answering device of Sonera and to provide a serial number to establish an account for the SIM-card. The account will be immediately credited with a sum of 52 USD. The account will be debited when telephone calls are made and short messages are sent. Furthermore, when the remaining value on the account approaches zero, the user can credit the account by buying a ticket carrying a serial code from a shop, calling to a dedicated telephone number, and entering the serial code. Each ticket is worth 17 USD. When the serial code is verified and accepted value related to the ticket, that is 17 USD, is credited to the user's account. In effect, the subscription arrangement is an extension to a mobile operator's own invoicing system. Instead of maintaining an ordinary user account to be debited afterwards, an account is established beforehand and then debited on use. Debiting the account requires reliable identification of the user so that no one else can access the user's account. This happens automatically in GSM phone calls and sending of short messages with the subscriber identification procedure using the SIM-card. However, reliable user identification is a pre-requisite for this subscription arrangement.

An alternative way to pay for telecommunications services provided by a service provider would be for payment to be made by credit card. In this case the credit risk would then lie with the credit card provider. However, this arrangement is limited to users who have an approved type of a credit card. Furthermore, credit cards are not a convenient way to deal with small payments, such as five US dollars or less. Additionally, some people do not want to provide their credit card information over a telecommunications network for security reasons.

Another payment method is to use so-called electronic money or e-money in form of data loaded onto a smart card. If a telephone terminal has a smart card reader and an application for sending e-money from the smart card to a service provider over a telecommunication link, then it is possible to pay for telecommunications services with a smart card. However, such an arrangement requires that smart cards and smart card readers be provided.

It is an object of the present invention to avoid or at least mitigate the problems described above.

SUMMARY OF THE INVENTION

According to a first aspect of the invention there is provided a method for prepayment of a service, comprising the steps of:

informing the user of the availability of a plurality of different services;

receiving from the user over a first communications link an indication of a desired service and a request for the desired service; and providing the requested service to the user over a second communications link;

characterised by said method further comprising the following steps:

receiving from the user an authentication key to indicate prepayment for the requested service;

verifying whether the authentication key is valid; and providing the requested service if the authentication key is valid.

A method according to the invention allows a service provider to make a plurality of different services available to users against prepayment. The user can freely select among the services offered. The prepayment allows any service provider to provide the services to users who are subscribers of a telecommunications network independently of any contracts made between the service provider and the telecommunications operator.

Advantageously, prepayment allows customers not having a credit card to access the services of the service provider. Even rather cheap services can be made available. Thus, it becomes economically reasonable for a service provider to sell services costing a relatively small monetary value.

The authentication key may be required each time a service is provided or alternatively it may be required at a first time and then used to authenticate a certain number of subsequent services. In the former case no user identification is necessary and services can be provided without any user identification procedure.

The first and second communications links can be different or the second communications link can be part of or a continuation of the first communications link. Preferably, the first communications link is based on at least one of the following: a Low Power Radio Frequency (LPRF) link, an infra red link, a data network, a telephone network, a mobile communications network, a local area network and a wide area network.

In an alternative embodiment, an attempt of reusing the same authentication key is detected by using a database. The database may be a database comprising either unused authentication keys or used authentication keys. In this way, it is easy to verify if the authentication key is valid and the requested service should be provided. In this embodiment, the method comprises the following steps before receiving the request from the user:

generating the authentication key;

maintaining an authentication key validity database for verifying the validity of any of the generated authentication keys; and delivering the authentication key to a user.

Preferably, the generating of the authentication keys conforms to certain algorithm(s), so that the validity of the authentication key can be determined in itself. The algorithm (s) used is/are preferably such that it is hard or impossible to determine which authentication keys are valid. In this way, there is no need to maintain a database of unused authentication keys, because the validity of an authentication key can be determined by applying the algorithm(s) to verify the authentication key submitted by the user. In this case, a database of all the used authentication keys is maintained.

Preferably, the method comprises the step of arranging each of the authentication keys to indicate a time period during which it is valid; and the step of verifying of validity of the authentication key comprises the step of comparing the present date with the a time period during which the authentication key is valid and the step of rejecting of the authentication key if its time period of validity has expired. Preferably, the method further comprises the step of scanning the database of used authentication keys for detecting lapsed authentication keys for removing them from the database of used authentication keys. In this way, the database of used authentication keys does not grow infinitely and the database is easier to maintain.

Preferably, the method comprises the step of modifying the validity database on providing the requested service so that the monetary value corresponding to the authentication key indicating the payment is reduced according to a price of the service requested by the user. By modifying the validity database on providing the requested service the service can be charged only when it is successfully provided to the user.

Alternatively, the modifying can be performed regardless whether the providing of service has been completed or not. Then it does not matter if the modifying precedes the actual providing of service.

The authentication key may be provided in the form of a printed code on a card. This card may readily be sold to the user. This provides a ready method of selling the authentication key to the user, for example in a shop. In this way, the service provider only needs to have a service providing server connected to a public telephone network to allow users to access the server for retrieval of services and does not require any revenue collecting functionality associated with the server. In this way, the service provider may automatically receive revenue from sale of cards rather than having to collect it by some other means. Typically, the service provider may receive income based upon a share of the sales price of the cards. Thus the service provider can use the prepayments to pay for the telecommunications fees which will be incurred by the delivery of the services. Therefore, instead of lending money to users the service provider can receive money from the user before providing the service. Therefore, the service provider will not have to bear a credit risk.

Preferably the method comprises the step of concealing the authentication key with a non-reversibly removable concealing means. This allows the user to detect easily whether an authentication key has already been disclosed for use and is thus become valueless, and also makes it possible for the user to transfer the card onward to another user, perhaps for further payment. Of course any "new" purchaser of the service can also verify that the authentication key has not been disclosed for use. Once the authentication key is disclosed, the user can supply it to the service provider.

Preferably the method comprises the step of providing the card with more than one authentication key so that the nominal value can be set to a convenient sum such as a single currency unit, for example, a dollar. However, at least some of the authentication keys may have an arbitrary value, for example 0,19 USD.

The step of the providing the service may comprise the further steps of:

allowing the user to test a service requested; and receiving a final verification from the user to ensure that the service corresponds to the needs of the user.

These steps may occur before the user is provided with the service and before the authentication key validity database is modified.

Providing a test version is preferably made in a way that prevents the user from fully utilising the object of the service. If the service is delivery of ringing tones, the provision of a testing may involve making a telephone call to the user and playing the ringing tone to the user. The user can listen to the ringing tone and determine whether it meets the expectations of the user. Preferably, in order to request the test version, the user may first provide an authentication key. The intended testing use may be determined by entering an authentication key worth less than what is required for the actual service. The authentication key used for testing may have a value just enough to cover the costs of making this call.

Preferably, at least some of the services relate to content providing. In this case, the step of informing the user of the availability of a plurality of different services informs the user of the availability of a plurality of different contents, and correspondingly, the step of providing the requested service provides the requested content. Content is information that is made available so that the user may get it and use it for some purpose, such as enhancing the operation of a mobile terminal or providing entertainment or news.

According to a second aspect of the invention there is provided a system for prepayment of a service, comprising:

means for informing the user of the availability of a plurality of different services;

means for receiving from the user over a first communications link an indication of a desired service and a request for the desired service; and means for providing the requested service to the user over a second communications link;

characterised by said system further comprising:

means for receiving from the user an authentication key to indicate prepayment for the requested service;

means for verifying whether the authentication key is valid; and means for providing the requested service if the authentication key is valid.

According to a third aspect of the invention there is provided a computer program product for prepayment of a service, comprising:

computer readable program means for causing a computer to inform the user of the availability of a plurality of different services;

computer readable program means for causing a computer to receive over a first communications link an indication of a desired service and a request for the desired service; and computer readable program means for causing a computer to provide the requested service to the user over a second communications link;

characterised by said computer program product further comprising:

computer readable program means for causing a computer to receive an authentication key to indicate prepayment for the requested service;

computer readable program means for causing a computer to verify whether the authentication key is valid, and computer readable program means for causing a computer to provide the requested service if the authentication key is valid.

Advantageously, the computer program product may convert a server connected to a telecommunications network such as Internet into a prepayment service capable of handling the actions relating to the prepayment of a service or to a plurality of services.

The present invention can be used in a mobile telephone or data terminal as well as in a wired telephone or data terminal, generally a device that can be connected to a communications network to use a telecommunications service.

BRIEF DESCRIPTION OF THE DRAWINGS

The invention will now be described, by way of example only, with reference to the accompanying drawings, in which.

DETAILED DESCRIPTION

Figure 1:
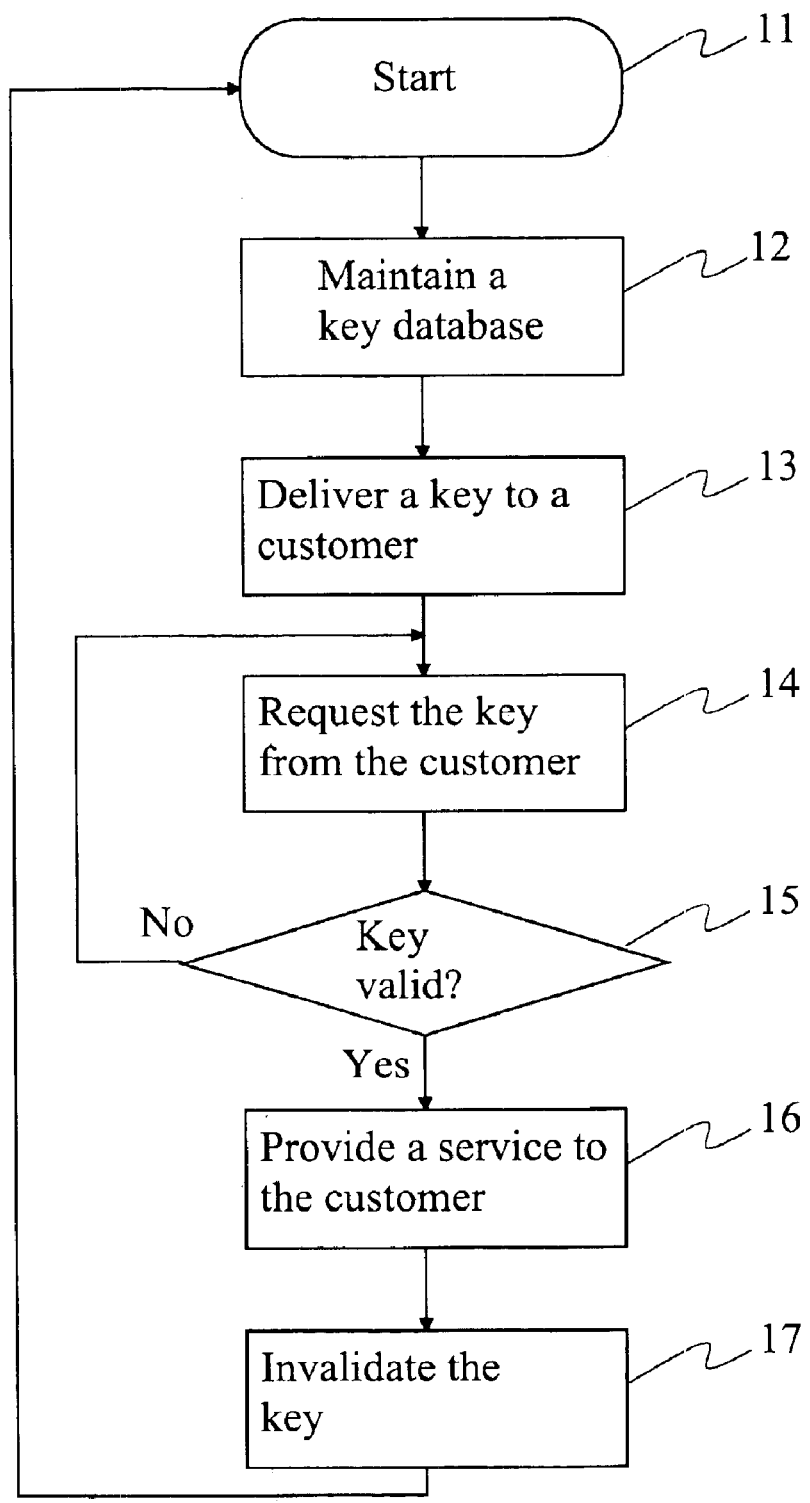
FIG. 1 shows a flow chart of a method for prepayment of a telecommunications service.

FIG. 1 shows a flow chart of a method for prepayment of a telecommunications service. The method shown in FIG. 1 starts from step 11, which can be a normal or idle state of a system in which the system is performing processes. These processes may be unrelated to the operation of the invention. Following step 11 is step 12, in which an authentication key validity database is maintained comprising authentication keys and their respective values. The authentication keys are certificates that prove prepayment of a service as will be explained further in more detail. A computer connected to the authentication key validity database generates the authentication keys. Maintaining the authentication key validity database involves receiving and/or generating of new authentication keys and recording them so that they correspond to their respective monetary values. It further involves invalidating authentication keys when they are used so that each particular authentication key may only be used once. This invalidation can be arranged to take place either after or before a service is provided to the user.

Once a suitable authentication key validity database has been configured, an authentication key is delivered to a service user. This is shown in step 13. The authentication keys are printed on cards shown in FIG. 4. The authentication keys are sequences of numbers so that they are easy to type.

Once the user has an authentication key, the authentication key can be used to obtain a service that costs a financial amount at most equal to the value of the authentication key. Suppose the user wants to request a new ringing tone to his or her mobile telephone from a service provider. A list of services may be presented on a WWW-page (World Wide Web) of a server of the service provider. A user may access the server with a personal computer that can be connected to the Internet. Each item of the list (for example each name of ringing tone) may be associated with a hyperlink so that by selecting the name of the ringing tone the user can request the ringing tone from the server. A request message is then sent to the server in a service request message that also comprises an identifier of the ringing tone. In response to such a service request message, a server requests for an authentication key from the user, as shown in step 14. The user reads the authentication key and enters it to the server to pay for the service. The validity of the authentication key is verified in step 15. In response to a successful entry of a valid authentication key, the telephone number of the user is prompted from the user. The requested service is then provided to the user in step 16 by sending the requested ringing tone as a short message to the user's mobile telephone number. If the authentication key is invalid, the authentication key is requested again in step 14. When the requested service, a ringing tone in this case, is provided to the user, the authentication key given by the user is invalidated in step 17 so that it cannot be used again.

The invalidation involves changing the authentication key validation database so that it shows that the authentication key already has been used when it is received from the user. The unused authentication keys are held in a database so that the presence of an authentication key in the database proves that the authentication key is unused and valid. In another embodiment, the used authentication keys are kept in the authentication key validity database so that the presence of the authentication key in the database shows that the authentication key is used and invalid. A further check may be performed for checking if an authentication key has lapsed from being valid as being too old, for example more than 12 months old.

In an alternative embodiment, a mobile telephone is used to obtain a list of services the service provider offers. In this case, the user sends a short message to the server and receives a response short message conveying a list of the services. The list may then be shown to a user on a display of the mobile telephone. The user may request the ringing tone from the service provider for example by sending a request message using the Short Message Service known from GSM. Of course, other request methods can be used, such as sending a facsimile or an e-mail message. In these cases, it is advantageous to include the authentication key in the message so that the authentication key is not requested from the user. In this case, the user should include his or her mobile telephone number in the message so that the server would know where to send the ringing tone, if the authentication key is valid. If the message is a short message, then the telephone number may be automatically included as an identifier of the sender of the short message.

In the most simple and straightforward case each authentication key grants the user to have one service provided once. In an alternative embodiment, the same authentication key may be used to pay more than one transaction. In this case, the value associated with the authentication key in the database is reduced by a fee of the service. An account is then given to the user and the remaining value of the authentication key is maintained on the account so that the user can check the remaining value by identifying himself. This identification can be automated using the cookie-technology known from the current WWW-browsers in case of WWW-based requesting or using short message sender identifier in case of mobile telephone originated requesting. With such automation the user can simply contact the service provider again and use the services with the remaining value without having to enter any identification codes.

Figure 2:
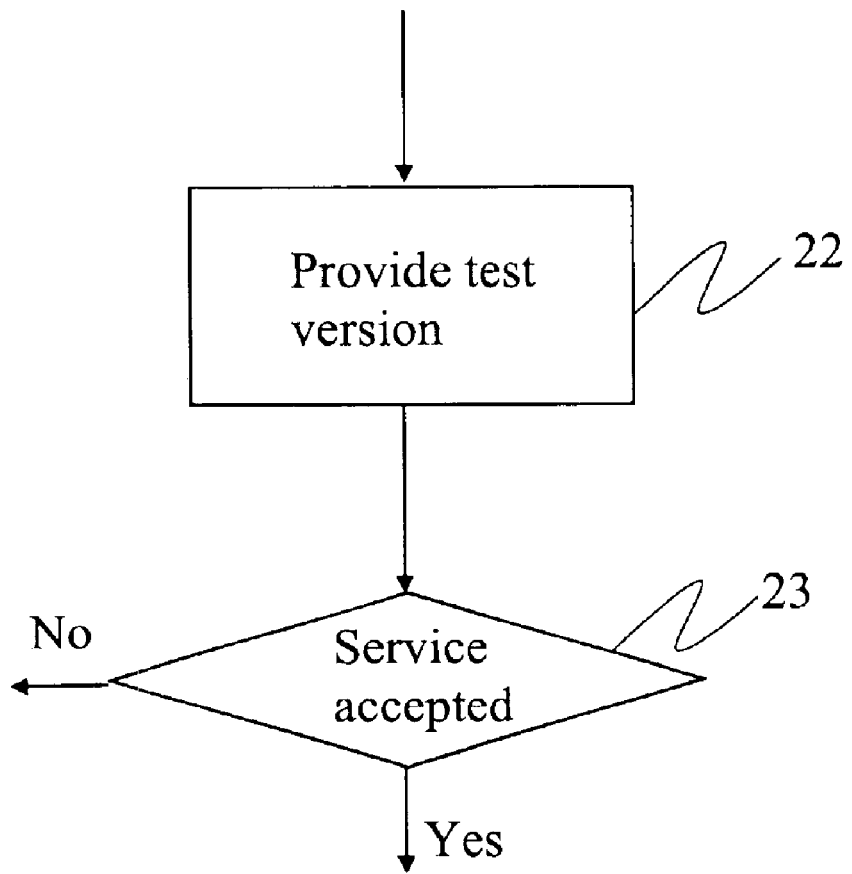
FIG. 2 shows additional steps for the method in FIG. 1.

FIG. 2 shows an addition to the method shown in FIG. 1. The addition comprises two steps, step 22 and step 23. In this embodiment, if the authentication key is verified as valid, the method proceeds to step 22 after step 15. In step 22 a test version of a service is provided to the user and in step 23 a check is carried out to see whether the user does indeed request the service. If the user orders the service, the method proceeds to step 16. If the user does not order the service, the method proceeds to step 17 or 11, depending on embodiment. If no payment is required for the test, then the step 11 will be next, otherwise in the step 17 an authentication key used for having the test version is invalidated.

Figure 3:
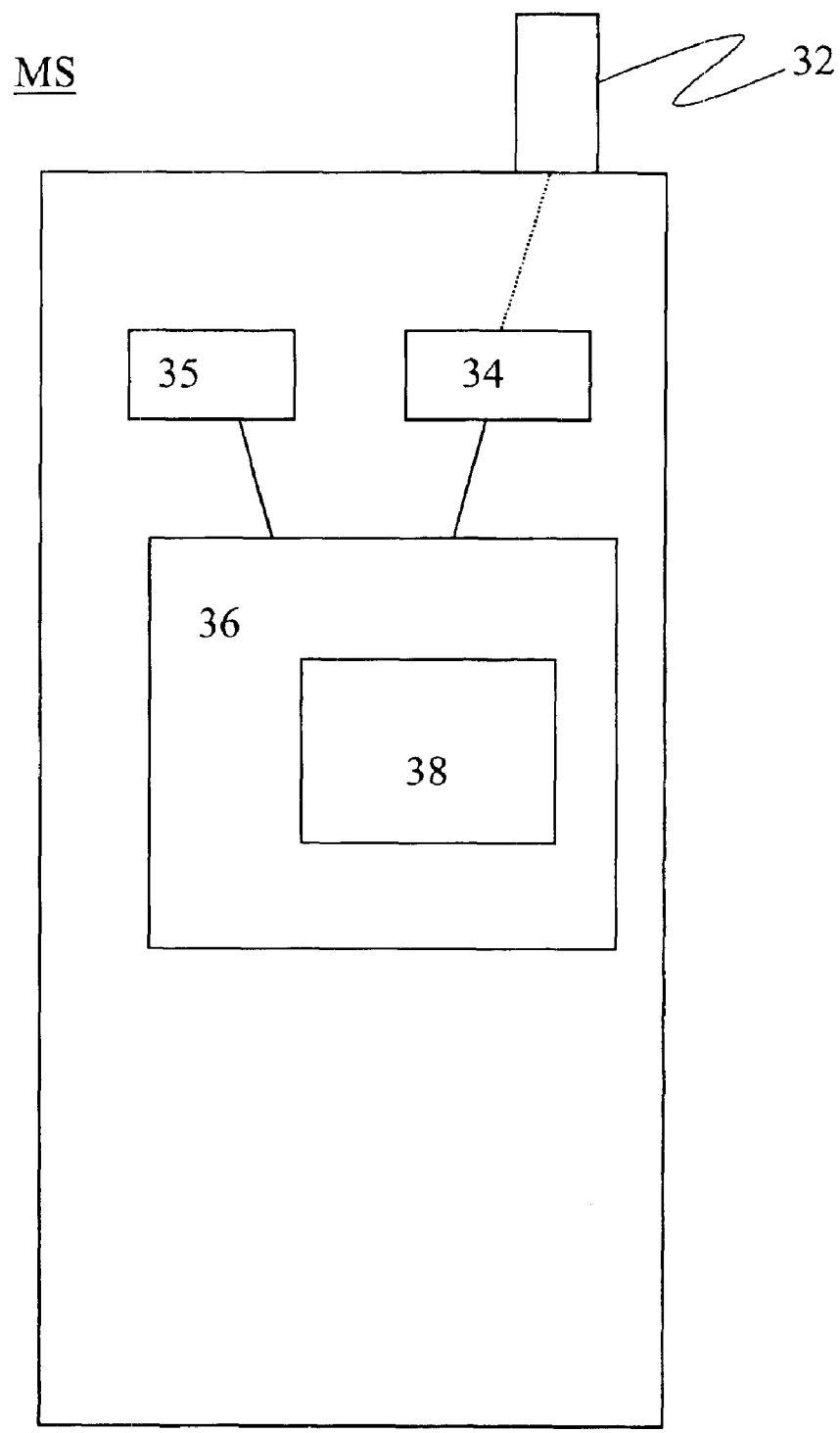
FIG. 3 shows a mobile telephone using the method of FIG. 1 or the method of FIGS. 1 and 2.

FIG. 3 shows a mobile telephone MS suitable for use with the methods of FIG. 1, or FIGS. 1 and 2. The mobile telephone MS comprises an aerial 32, a radio block 34, a user interface 35, a processing means 36 and a program 38. The aerial is connected to the radio block, which is in turn connected to the processing means. The processing means comprises a microprocessor for executing instructions and a memory for maintaining the instructions. The processing means further comprises the program 38 that is used for controlling the mobile telephone MS. The user interface 35 comprises input and output means, having one or more authentication keys, a display, a speaker, and a microphone. The mobile telephone MS is arranged so as to receive a ringing tone from a radio broadcast and to use that ringing tone to alert its user to an incoming telephone call. The telephone also allows the user to send the request for a ringing tone by using its user interface and radio block 34.

Figure 4:
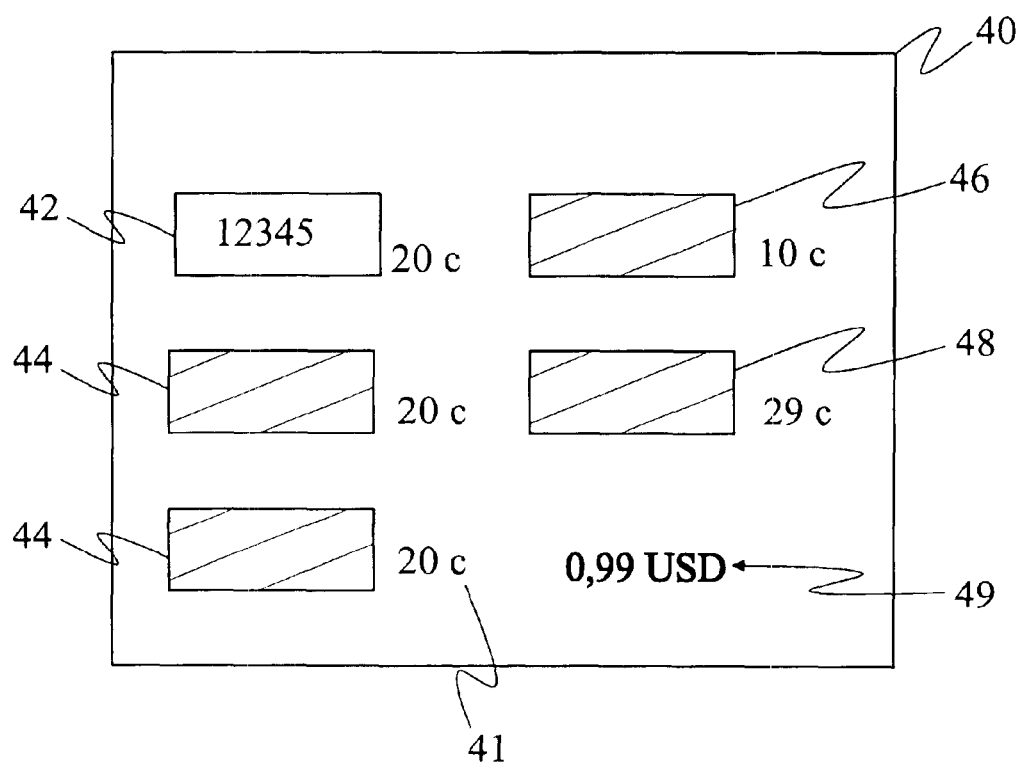
FIG. 4 shows a prepaid authentication key card for payment of telecommunications services.

FIG. 4 shows a prepaid authentication key card 40 for payment of telecommunications services. The authentication key card 40 comprises five authentication keys 42, 44, 44, 46 and 48. Next to each authentication key there is printed a corresponding value. The authentication keys (44, 46, and 48) are initially covered with an opaque layer of a material easy to remove, for example wax or soft lacquer. Thus the authentication keys are not readable until the user uncovers them, for example by scratching the opaque layer. Thus, when buying the card the user can easily verify that the card is unused and all the authentication keys are valid. When the layer of material is removed, the authentication key underneath it becomes visible to the user. Hence the covering of an authentication key proves continuing validity of the authentication key. In this example authentication keys 42 to 44 correspond to a value of 20 cents, whereas authentication keys 46 and 48 correspond to 10 and 29 cents. Thus the total price (49) 0,99 USD of the card is printed on the card so that a user can immediately see it, for example when it is purchased in a shop.

Figure 5:
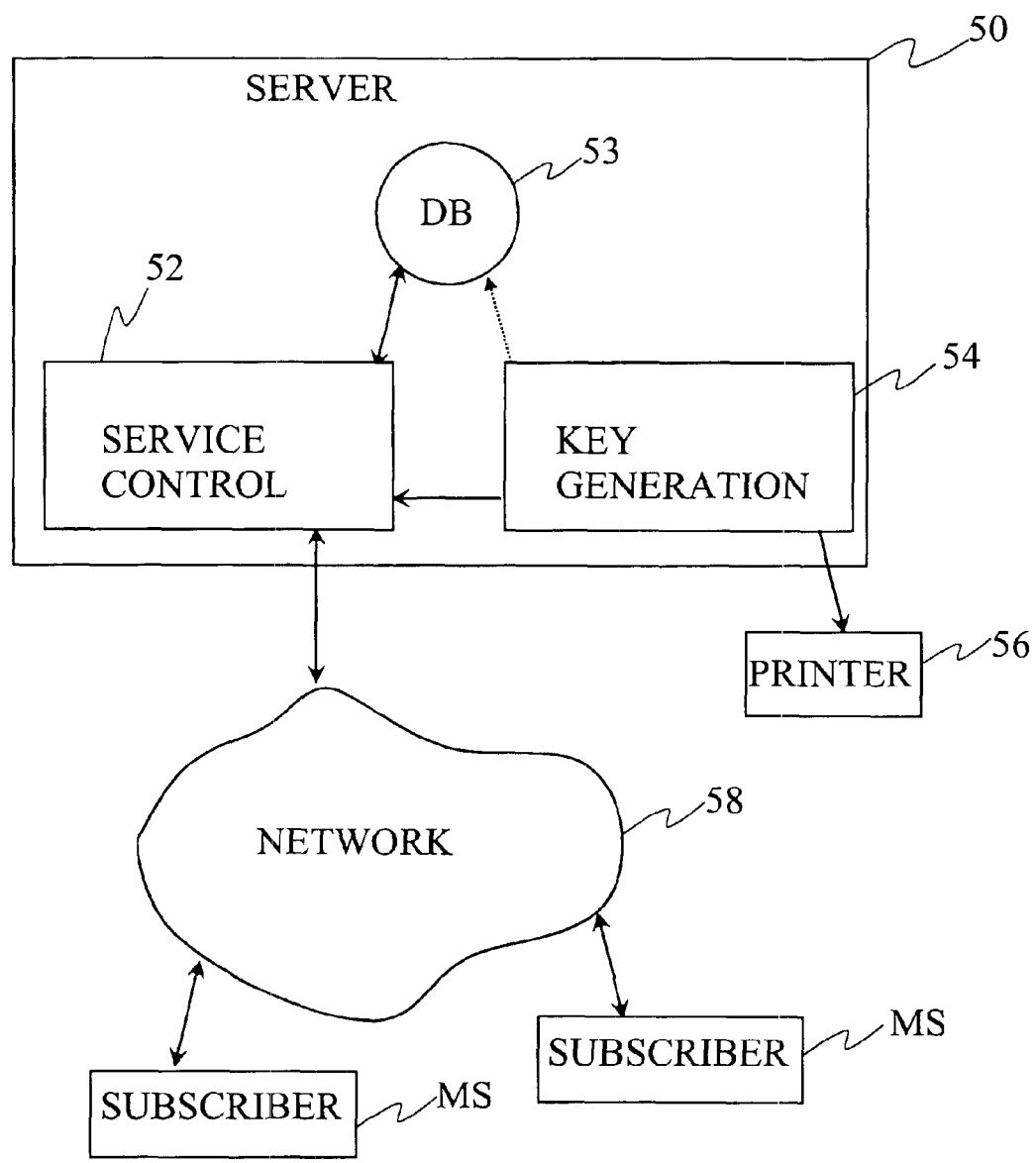
FIG. 5 shows a block diagram of a prepayment system.

FIG. 5 shows a block diagram of a prepayment system according to an embodiment of the invention. The system comprises a prepayment server 50, a service control block 52, an authentication key validity database 53 and an authentication key generation block 54 at the server. The prepayment server 50 is an ordinary server computer attached to the Internet and comprising software causing it to implement the prepayment method as described before. The system comprises further a card printer 56, a telecommunications network 58, and a plurality of user devices MS. The prepayment server generates the authentication keys, controls the printout of the authentication keys and controls the payment of the services. The network relays the data traffic between the server and the user devices MS. The generation block produces the authentication keys and sends them both to the printer for printing and to the service control block 52. The printer prints sets of authentication keys on cards (as shown in FIG. 4). The service control block maintains the database 53 of authentication keys and stores the authentication keys and their respective values in the database 53. When the card is delivered to a user, he or she may contact the service provider and request a service. In response for this request, the service provider checks the prepayment of service with the service control block 52 of the prepayment server. The user sends the authentication key over the network to the prepayment server's service control block, which verifies the validity of the authentication key and whether the value associated to the authentication key is sufficient to the price of the requested service. It the authentication key is valid and corresponds to a monetary value at least equal to the price, then the server permits the delivery of the service requested and reduces the monetary value corresponding to the authentication key that was used. The prepayment server may additionally provide the service requested. In this case the server 50 delivers the service over the network 58 to the user device MS of the user.

In a preferred embodiment, there is additionally provided a second server to provide a list of services to the user and to receive user input such as the selection of service and the authentication key. In this case, the second server may reside anywhere, provided that information can be exchanged between the second server and the prepayment server. Both servers are connected to the Internet so that no mobile telephone operator networks would be involved in cases other than providing a service over a mobile telecommunications network. Using the ringing tone example, the second server residing in the Internet may receive a request for a specific ringing tone from a user having an access to the internet and having a mobile telephone that can receive a ringing tone from a mobile telecommunications network. In response to the request, a prepayment authentication key and the mobile telephone number of the user are requested and the authentication key is verified, and if accepted, the specific ringing tone is sent to the mobile telephone as a message (for example a short message). The sending of the ringing tone over the mobile telecommunications network involves use of services of a telecommunications network, but at least many GSM telephone operators provide forwarding of abroad originated short messages to mobile telephones residing in their networks. The ringing tones and other such supplementary services that provide electrical content to a mobile telephone can thus be send practically from all over the world. Another examples of electrical content providing available in mobile telecommunications include pictures to be used in picture messaging, caller group images and operator logos. It is also possible to provide music songs or video clips. The forthcoming third generation mobile stations are expected to have multimedia functionality allowing use of this kind of information.

In the foregoing, a service means any service that can be provided via a communications channel, for example, delivery of a ringing tone or an electrical greeting card, a musical or video recording from a record company, a donation to charity, payment of car parking fee or a public transportation fee, for which information is simply sent to a server, and nothing is necessarily received. Thus the service can be a transfer of information in either direction, such as to a user, from a user, or in both directions.

Cheap authentication key cards can be bought with small money. Thus the service is easy to afford, which is likely to promote selling new ringing tones, images and other commercial services like these.

This paper presents the implementation and embodiments of the invention with the help of examples. It is obvious to a person skilled in the art that the invention is not restricted to details of the embodiments presented above, and that the invention can be implemented in another embodiment without deviating from the characteristics of the invention. Thus, the presented embodiments should be considered illustrative, but not restricting. There are numerous ways to vary within the scope of the invention as illustrated below.

Concealing of the authentication key may be arranged by printing the key on a paper, folding it and sealing closed so that the code is not visible until the ticket is opened.

A printed authentication key may be a sequence of any characters. There may be only one single authentication key on one card.

The authentication key may be printed on the card as a bar code, or the authentication key may be attached as some other machine-readable code. The machine-readable code may be a special shape of a card or a magnetic strip. The machine-readable code may be read by a machine such as a reader of a computer or telephone terminal equipped with such a reader.

The sending of the request may be sending of the authentication key to a World Wide Web-page on the server or sending of an e-mail or short message, or a datagram of any other form. Both the request and the service may be sent in short messages. In this way, a short message centre of a mobile telecommunications network may buffer the messages if the receiving party can not temporarily receive short messages.

The authentication key may be sent directly to the user over a communications link, if the user pays directly to the service provider.

Steps 16 and 17 may be in any order, although it is convenient to check, for example automatically, whether the service can indeed be provided to the user if the service is provided prior to invalidating the authentication key or changing the corresponding value thereof. This can be applied in a situation in which the user's device is to receive a ringing tone but does not completely receive it for example if the mobile terminal runs out of power.

Step 22 may comprise sending the test version of the service over the Internet or making a telephone call to the user and audibly playing the ringing tone to the user so that the user can listen to the tone and decide if it is a ringing tone the user would like to have. If it is, the user can pay for the complete service, for example by giving another authentication key corresponding to the price of the service. The testing may have a lower price that may just cover the costs of providing the user with the test version. Alternatively, the testing may be free of charge.

Instead of printing the cards near the server, a set of distributed printers at delivery points (e.g. shops) may be provided to enhance the logistics of the cards comprising the authentication keys.

In yet another alternative embodiment, the telecommunications operator delivers the authentication keys in response to use of a premium telecommunications service (premium telephone call or short message). The user pays for a service by using the premium service causing income to the telecommunications operator. The telecommunications operator shares the income with the service provider. In return for the payment, the user is provided with one or more authentication keys. In this case, the authentication key(s) may be transmitted electrically to the user. The advantage of the embodiment is that no physically existing card need to be sent to the user.

Hence, the possibilities of implementing and using the invention are only restricted by the enclosed patent claims. Consequently, the various options of implementing the invention as determined by the claims, including the equivalent implementations, also belong to the scope of the present invention.

What is claimed is:

1. A method for prepayment of a content, comprising the steps of:

generating one or more authentication keys;

providing an authentication key validity database for verifying the validity of any of the one or more generated authentication keys;

delivering at least one of the one or more authentication keys to a user;

informing the user of the availability of a plurality of different contents for downloading;

receiving from the user over a first communications link an indication of a desired content and a request for the desired content;

receiving from the user the at least one authentication key to indicate prepayment for the requested content;

verifying the validity of the at least one authentication key by means of the validity database;

providing the requested content to the user over a second communications link; and invalidating the at least one authentication key in the validity database in response to the providing of the requested content to the user.

2. A method according to claim 1, wherein an individual one of the one or more authentication keys is required each time a content is provided.

3. A method according to claim 1, the method further comprising:

arranging each of the one or more authentication keys to indicate a time period during which they are valid;

wherein verifying the validity of the at least one authentication key includes comparing a present date with the time period during which the at least one authentication key is valid; and invalidating expired authentication keys.

4. A method according to claim 3, the method further comprising:
scanning the validity database to detect and remove invalid authentication keys.

5. The method according to claim 1, further comprising modifying the validity database on providing the requested content so that the monetary value corresponding to the at least one authentication key indicating prepayment is reduced according to a price of the content requested by the user.

6. A method according to claim 1, wherein the at least one authentication key is a printed user readable code.

7. A method according to claim 6, wherein the method further comprises printing a group of the at least one authentication keys on a card.

8. A method according to claim 1, wherein the method further comprises concealing the at least one authentication key with a non-reversibly removable concealing means.

9. A method according to claim 1, wherein the first communications link is based on at least on of the following: a data network, a telephone network, a mobile telecommunications network, a local area network and a wide area network.

10. A method according to claim 1, the method further comprising:
allowing the user to test a content requested; and
receiving a final verification from the user before the user is provided with the content.

11. A system for prepayment of a content, comprising:
means for generating one or more authentication keys;
an authentication key validity database for verifying the validity of any of the one or more generated authentication keys;
means for delivering at least one of the one or more authentication keys to a user;
means for informing the user of the availability of a plurality of different contents for downloading;
means for receiving from the user over a first communications link an indication of a desired content and a request for the desired content; and
means for receiving from the user the at least one authentication key to indicate prepayment for the requested content;
means for verifying the validity of the at least one authentication key by means of the validity database;
means for providing the requested content to the user over a second communications link; and
means for invalidating the at least one authentication key in the validity database in response to the providing of the requested content to the user.

12. A computer program product for prepayment of a content, comprising:
computer readable program means for generating one or more authentication keys;
computer readable program means for providing an authentication key validity database for verifying the validity of any of the one or more generated authentication keys;
computer readable program means for causing a computer to provide at least one of the one or more authentication keys to a user;
computer readable program means for causing a computer to inform the user of the availability of a plurality of different contents for downloading;
computer readable program means for causing a computer to receive from the user over a first a first communications link an indication of a desired content and a request for the desired content; and
computer readable program means for receiving from the user the at least one authentication key to indicate prepayment for the requested content;
computer readable program means for verifying the validity of the at least one authentication key by means of the validity database;
computer readable program means for causing a computer to provide the requested content to the user over a second communications link; and
computer readable program means for invalidating the at least one authentication key in the validity database in response to the providing of the requested content to the user.

* * * * *